Feb. 8, 1949.  C. O. LASSY  2,460,890
WORK-HOLDING MEANS
Filed Aug. 28, 1946 — 2 Sheets-Sheet 1

Inventor
Carl O. Lassy
By Rockwell & Bartholow
Attorneys

Feb. 8, 1949.  C. O. LASSY  2,460,890
WORK-HOLDING MEANS
Filed Aug. 28, 1946  2 Sheets-Sheet 2
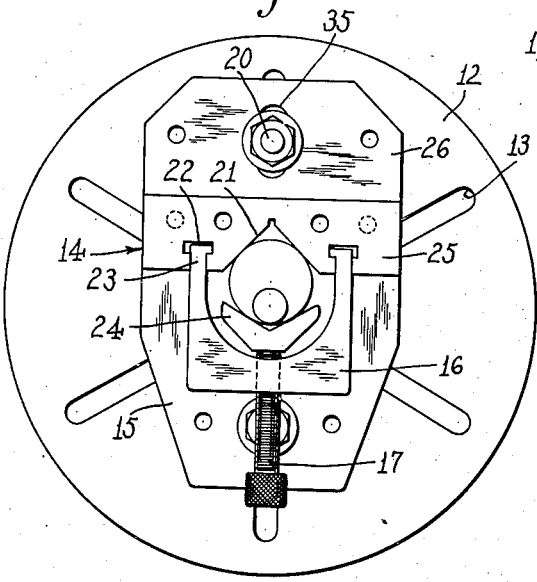
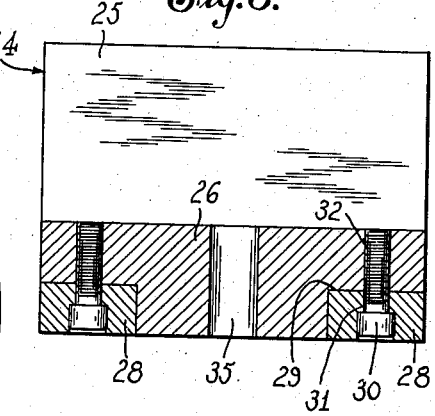
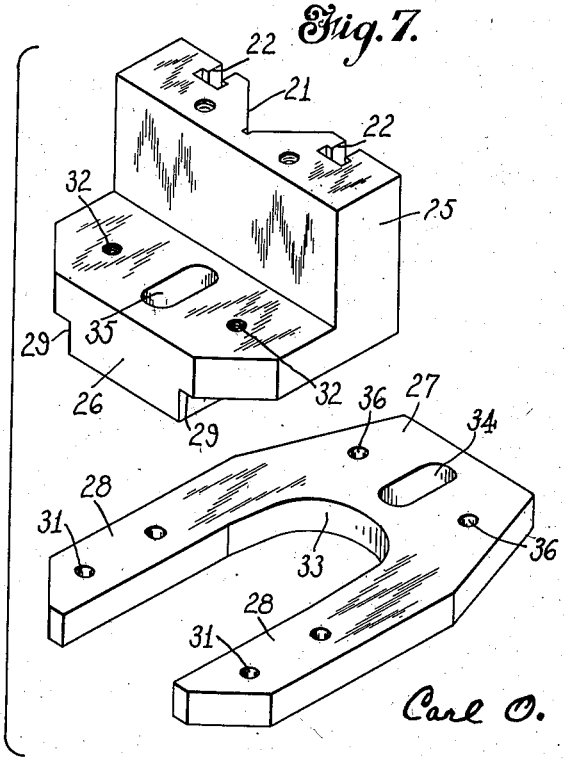
Inventor
Carl O. Lassy
By Rockwell & Bartholow
Attorneys Patented Feb. 8, 1949

2,460,890

UNITED STATES PATENT OFFICE 2,460,890

WORK-HOLDING MEANS

Carl O. Lassy, Plainville, Conn.

Application August 28, 1946, Serial No. 693,466

7 Claims. (Cl. 279—6)

This invention relates to work-holding means for use in machine shops, and more particularly to work-holding means used in connection with lathes and similar tools, where the workpiece is attached to a rotating face plate or similar member.

One of the objects in view is to provide an improved work-holding means for use in connection with a face plate or similar rotating slotted member.

Another object is to facilitate the placement of the work in the lathe or similar machine tool, and to provide a work holder in which the workpiece is readily adjustable relatively to the face plate, so that workpieces of different size can be accommodated and have various operations performed upon them.

Another object is to enlarge the scope of a work holder of this general character.

In the accompanying drawings:

Fig. 5 is a view similar to Fig. 3, showing the clamping of a workpiece of larger diameter than that shown in Fig. 3;

Fig. 6 is a section on line 6—6 of Fig. 4; and

Fig. 7 is an exploded perspective view of the two principal members of the work holder.

Figure 1:
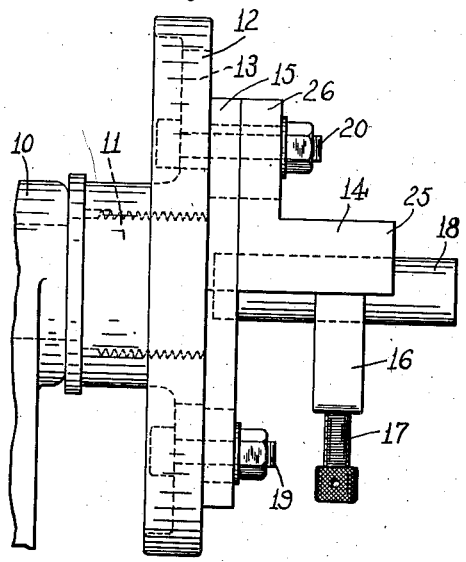
Fig. 1 is a side elevation of an assembly, including a rotary face plate carried by a headstock, and a work-holding means mounted upon the face plate, the work-holding means having a workpiece clamped therein.

In the drawings, I have shown the invention as used in connection with a face plate of a metal-turning lathe, the face plate being used in connection with a headstock of usual structure, and the face plate itself being provided, as customary, with the usual radial slots by means of which work can be bolted to the face plate. My improved work-holding means is shown as bolted on the face of the face plate, and as having clamped therein a round bar such as may be turned in the lathe. The cutting or other tool is not shown as it forms no part of the present invention. The work-holding means is such as to enable the workpiece to be disposed in the rotating axis of the face plate, and the work-holding means, as hereinafter described, is made up of separate relatively adjustable elements, one of which is an angle member having in one of its legs a V-shaped recess in which the workpiece is received and clamped, and another member being a back plate which is secured to the angle member. These two members are so constructed that the composite work holder created thereby can be bolted in the desired position on the face plate, and can be adjusted on the face plate, as hereinafter described.

In the drawings, the headstock of the lathe is shown at 10, the hollow headstock spindle at 11, and the face plate at 12. The face plate is shown as provided with six radial slots 13. The work-holding means comprises the angle member 14, the back plate 15, and the clamping yoke 16 having a screw 17 by means of which the workpiece 18 is clamped in place. The members 14 and 15 are secured together by means hereinafter described, and the work-holding means is fastened to the face plate by a lower bolt 19 (Fig. 1) passing through the back plate 15 and the face plate, and by an upper bolt 20 passing through the back plate and the face plate and also through one of the legs of the angle member.

Figure 3:
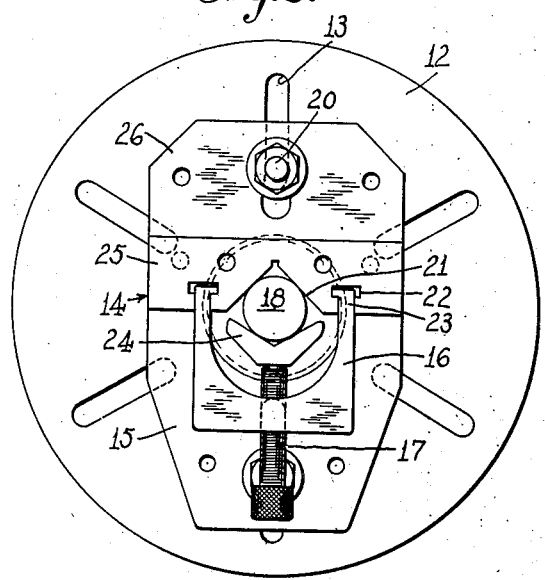
Fig. 3 is a view looking from the right of Fig. 1.

The angle member 14, as appears from Fig. 3, has on its lower or outermost face a longitudinal V-shaped recess 21 extending throughout the length of the leg, and in which the round workpiece is accommodated. Adjacent the lower or outermost face of the angle member (Fig. 3) there are provided T slots 22, the same being located at opposite sides of the recess 21. The clamping yoke 16 has foot portions 23 engaged in the T slots, said foot portions being of appropriate cross section, and the arrangement preferably being such that, as the workpiece is clamped in position in the angle member, the clamping yoke is firmly held in the selected position by the action of the clamping screw 17. In the form shown, a V-shaped clamping piece 24 is set between the workpiece and the inner end of the clamping screw so as to avoid mutilation of the work.

Figure 4:
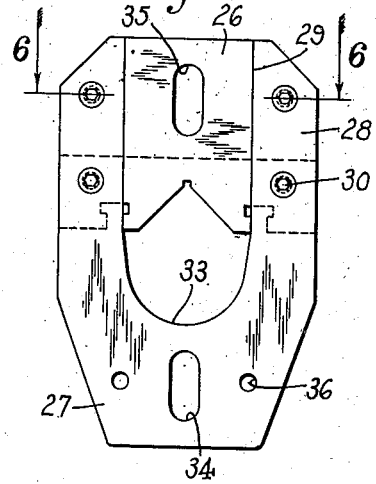
Fig. 4 is a view of two members of the work holder, looking from the rear of the back plate.

The leg of angle member 14 in which the V-shaped recess is formed is indicated at 25, and the other leg at 26. In the form shown, these legs are of substantially equal length, but variation may be made in this respect if desired. The back plate 15 is of less thickness than the legs, and is made substantially in the form of a yoke or fork, as best shown in Fig. 4, so that portions at the sides of the fork can be placed in rabbets or grooves at the rear face of the angle member. As best shown in Fig. 7, the back plate has a body 27 with projecting side portions or tines 28 creating the sides of the fork, and the tines 28 are adapted to be received in rabbets 29 at the sides of the angle member and at the rear face thereof, so that the tines are flush with the angle iron at the rear corners thereof. The tines are held in the rabbets by means such as the screws 30 passing through holes 31 in the tines, and entering threaded sockets 32 in the leg 26. In the form shown, the tines extend through the full height of the angle member, and portions thereof are located below the angle member, these portions joining the body, and the body having between the tines and below the angle member a crotch or recess 33 (Fig. 4) into which an end portion of the workpiece 18 can extend, as shown by the dotted lines in Fig. 1, whereby the yoke-like back plate clears the workpiece. The body 27 of the back plate is provided with a slot 34 adapted to register with any one of the slots 13 of the face plate, and to receive fastening bolt 19. A similar slot 35 is provided in leg 26 in the median plane thereof, and this slot is adapted to register with a diametrically opposite slot of the face plate in placing the work-holding fixture on the face plate. The bolts 19 and 20 provide for securing the fixture to the face plate adjacent opposite ends of the fixture in a manner to permit adjustment of the fixture or work holder diametrically with reference to the face plate.

In the set-up of the workpiece as shown in Fig. 3, it will be noted that the axis of the workpiece coincides with the axis of the rotating face plate, and the workpiece will revolve about its own center. Supposing, however, that it is desired to cut the workpiece by the use of a stationary cutting tool with respect to an axis eccentric to the workpiece, the workpiece can be shifted diametrically with reference to the face plate to a position such as shown in Fig. 5 by way of example. Such a set-up would be used in reducing the workpiece at the end so as to form a small eccentric thereon. It will be obvious that the adjustment of the work holder to positions such as shown by way of example in Figs. 3 and 5 can be readily accomplished by loosening the fastening bolts, shifting the holder, and then tightening up the bolts to clamp the holder in the new position. The assemblies of Figs. 1 to 3 and of Fig. 5 are, of course, given merely by way of example. The holes 36 formed in body 27 at opposite sides of slot 34 may be used for the attachment of suitable counterweights, if desired, for the purpose of balancing the work holder.

Figure 2:
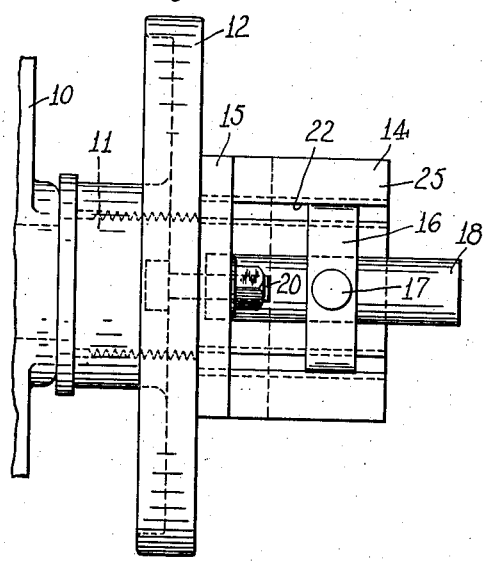
Fig. 2 is a bottom plan view of the parts shown in Fig. 1.

It will be apparent that by my improvements the workpiece can be very easily mounted on the face plate and detached therefrom, and that the workpiece can extend in line with the axis of the face plate or can be somewhat offset therefrom. Also the workpiece can be set very close to the operative face of the face plate, as shown in the assembly of Fig. 1, or can be extended through the face plate and hollow spindle without interference. The necessary adjustments of the work holder can be very readily effected, and the work holder itself is of simple form, having the feature of a V block adapted to accommodate a piece of round stock, and at the same time providing a simple and satisfactory means of connection to the face plate.

Various modifications and changes in the details may be made without departing from the principles of the invention or the scope of the claims.

What I claim is:

1. The combination of a rotary face plate having a plurality of radial slots with pairs of slots diametrically aligned, and a work holder adjustably secured by fastening bolts adjacent its opposite ends in diametrically arranged slots at opposite sides of the face plate center, said work holder comprising a back plate lying against the face plate and through which said bolts pass, and a separate angle member set against the back plate and having in one of its legs a slot through which one of said bolts passes, the other leg of the angle member being at right angles to the face plate and having on the outermost face of such other leg a longitudinal V-shaped recess, and means for clamping a workpiece in said recess.

2. The combination of a rotary face plate having a plurality of radial slots with pairs of slots diametrically aligned, and a work holder adjustably secured by fastening bolts adjacent its opposite ends in diametrically arranged slots at opposite sides of the face plate center, said work holder comprising a back plate lying against the face plate and through which said bolts pass, and a separate angle member set against the back plate and having in one of its legs a slot through which one of said bolts passes, the other leg of the angle member being at right angles to the face plate and having on the outermost face of such other leg a longitudinal V-shaped recess, and means for clamping a workpiece in said recess, said back plate being in the form of a yoke straddling the angle member.

3. The combination of a rotary face plate having a plurality of radial slots with pairs of slots diametrically aligned, and a work holder adjustably secured by fastening bolts adjacent its opposite ends in diametrically arranged slots at opposite sides of the face plate center, said work holder comprising a back plate lying against the face plate and through which said bolts pass, and a separate angle member set against the back plate and having in one of its legs a slot through which one of said bolts passes, the other leg of the angle member being at right angles to the face plate and having on the outermost face of such other leg a longitudinal V-shaped recess, and means for clamping a workpiece in said recess, said back plate being in the form of a yoke straddling the angle member, said yoke having a clearance opening adjacent the second-mentioned leg of the angle member into which a workpiece supported in said V-shaped recess can be extended.

4. The combination of a rotary face plate having a plurality of radial slots with pairs of slots diametrically aligned, and a work holder adjustably secured by fastening bolts adjacent its opposite ends in diametrically arranged slots at opposite sides of the face plate center, said work holder comprising a back plate lying against the face plate and through which said bolts pass, and a separate angle member set against the back plate and having in one of its legs a slot through which one of said bolts passes, the other leg of the angle member being at right angles to the face plate and having on the outermost face of such other leg a longitudinal V-shaped recess, and means for clamping a workpiece in said recess, said back plate being in the form of a yoke straddling the angle member, said yoke having a clearance opening adjacent the second-mentioned leg of the angle member into which a workpiece supported in said V-shaped recess can be extended, the back plate straddling the angle member by means of tines or branches received in a substantially flush position in rabbets at the sides of the angle member.

5. In a device such as described, the combination of an angle member having legs at right angles to each other, one of which is provided on an external surface with a longitudinal recess V-shaped in cross section, a yoke-shaped back plate adapted to straddle the angle member and to lie within rabbets in the other leg thereof, and means whereby the assembled angle member and back plate can be supported on a slotted face plate for radial adjustment thereon.

6. In a device such as described, the combination of an angle member having a V-shaped recess extended longitudinally of the outer face of one leg and having grooves extended longitudinally along the outer face of the other leg, and a fork-shaped back plate having tines detachably held in said grooves.

7. In a device such as described, a back plate for a work-clamping device constructed in the form of a yoke or fork and having tines provided with perforations, said back plate having a body from which the tines project, said body being provided with a longitudinal median slot.

CARL O. LASSY.

REFERENCES CITED

The following references are of record in the file of this patent:

UNITED STATES PATENTS

| Number | Name | Date |
| --- | --- | --- |
| 1,802,914 | Gruber | Apr. 28, 1931 |
| 2,371,831 | Leming | Mar. 20, 1945 |

FOREIGN PATENTS

| Number | Country | Date |
| --- | --- | --- |
| 523,062 | France | Aug. 25, 1920 |
| 5,662 | Great Britain | Apr. 2, 1889 |